US010237295B2

(12) United States Patent
Zhang et al.

(10) Patent No.: US 10,237,295 B2
(45) Date of Patent: Mar. 19, 2019

(54) AUTOMATED EVENT ID FIELD ANALYSIS ON HETEROGENEOUS LOGS

(71) Applicant: NEC Laboratories America, Inc., Princeton, NJ (US)

(72) Inventors: Hui Zhang, Princeton Junction, NJ (US); Guofei Jiang, Princeton, NJ (US)

(73) Assignee: NEC Corporation (JP)

( * ) Notice: Subject to any disclaimer, the term of this patent is extended or adjusted under 35 U.S.C. 154(b) by 175 days.

(21) Appl. No.: 15/429,849

(22) Filed: Feb. 10, 2017

(65) Prior Publication Data

US 2017/0279840 A1 Sep. 28, 2017

Related U.S. Application Data

(60) Provisional application No. 62/311,436, filed on Mar. 22, 2016.

(51) Int. Cl.
*H04L 29/06* (2006.01)

(52) U.S. Cl.
CPC ................................ *H04L 63/1425* (2013.01)

(58) Field of Classification Search
CPC ........ G06F 21/55; G06F 21/50; G06F 21/552; G06F 21/577; G06F 2221/034; H04L 63/1425; H04L 63/14
USPC ............................................................ 726/23
See application file for complete search history.

(56) References Cited

U.S. PATENT DOCUMENTS

2012/0137367 A1* 5/2012 Dupont ................... G06F 21/00 726/25
2013/0067575 A1* 3/2013 Zuk ..................... H04L 63/1425 726/23
2014/0344622 A1* 11/2014 Huang .................. G06F 11/079 714/37
2016/0261482 A1* 9/2016 Mixer ..................... H04L 43/12

OTHER PUBLICATIONS

Xu, W. et al., "Detecting Large-Scale System Problems by Mining Console Logs" In Proceedings of the ACM SIGOPS 22nd symposium on Operating systems principles (SOSP '09) (Oct. 2009) pp. 117-132.

* cited by examiner

*Primary Examiner* — Yogesh Paliwal
(74) *Attorney, Agent, or Firm* — Joseph Kolodka

(57) ABSTRACT

A system, program, and method for anomaly detection in heterogeneous logs. The system having a processor configured to identify pattern fields comprised of a plurality of event identifiers. The processor is further configured to generate an automata model by profiling event behaviors of the plurality of event sequences, the plurality of event sequences grouped in the automata model by combinations of one or more pattern fields and one or more event identifiers from among the plurality of event identifiers, wherein for a given combination, the one or more event identifiers therein must be respectively comprised in a same one of the one or more pattern fields with which it is combined. The processor is additionally configured to detect an anomaly in one of the plurality of event sequences using the automata model. The processor is also configured to control an anomaly-initiating one of the network devices based on the anomaly.

12 Claims, 9 Drawing Sheets

1000

Identify, from the heterogeneous logs, pattern fields comprised of a plurality of event identifiers.
1010

Generating an automata model by profiling event behaviors of the plurality of event sequences, the plurality of event sequences grouped in the automata model by combinations of one or more pattern fields and one or more event identifiers from among the plurality of event identifiers, wherein for a given combination, the one or more event identifiers therein must be respectively comprised in a same one of the one or more pattern fields with which it is combined.
1020

Detect an anomaly in one of the plurality of event sequences using the automata model.
1030

Control an anomaly-initiating one of the network devices based on the anomaly.
1040

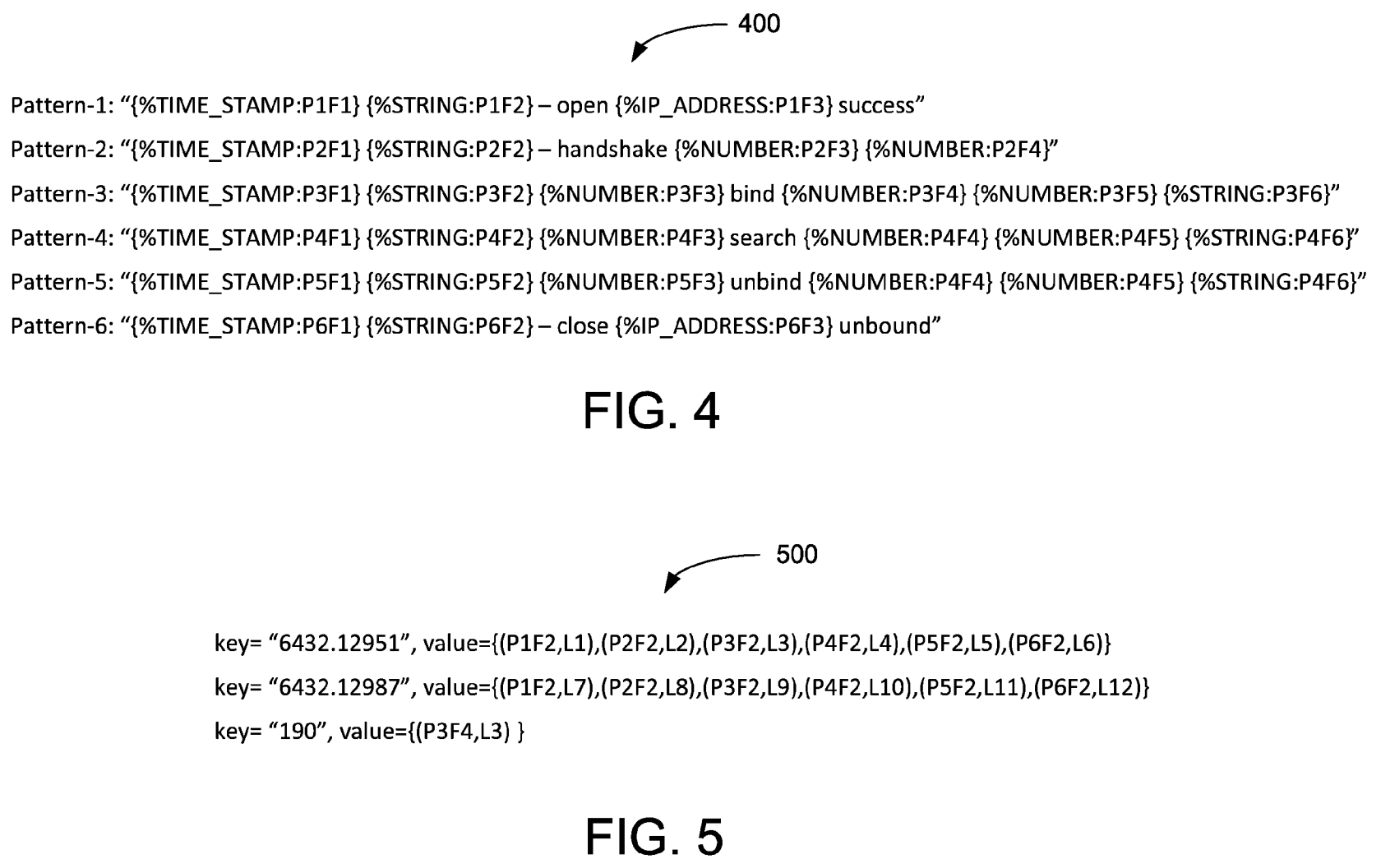

400

Pattern-1: "{%TIME_STAMP:P1F1} {%STRING:P1F2} – open {%IP_ADDRESS:P1F3} success"

Pattern-2: "{%TIME_STAMP:P2F1} {%STRING:P2F2} – handshake {%NUMBER:P2F3} {%NUMBER:P2F4}"

Pattern-3: "{%TIME_STAMP:P3F1} {%STRING:P3F2} {%NUMBER:P3F3} bind {%NUMBER:P3F4} {%NUMBER:P3F5} {%STRING:P3F6}"

Pattern-4: "{%TIME_STAMP:P4F1} {%STRING:P4F2} {%NUMBER:P4F3} search {%NUMBER:P4F4} {%NUMBER:P4F5} {%STRING:P4F6}"

Pattern-5: "{%TIME_STAMP:P5F1} {%STRING:P5F2} {%NUMBER:P5F3} unbind {%NUMBER:P4F4} {%NUMBER:P4F5} {%STRING:P4F6}"

Pattern-6: "{%TIME_STAMP:P6F1} {%STRING:P6F2} – close {%IP_ADDRESS:P6F3} unbound"

FIG. 4

500 key= "6432.12951", value={(P1F2,L1),(P2F2,L2),(P3F2,L3),(P4F2,L4),(P5F2,L5),(P6F2,L6)} key= "6432.12987", value={(P1F2,L7),(P2F2,L8),(P3F2,L9),(P4F2,L10),(P5F2,L11),(P6F2,L12)} key= "190", value={(P3F4,L3) }

FIG. 5

700 begin event type “P1: P1F2”;

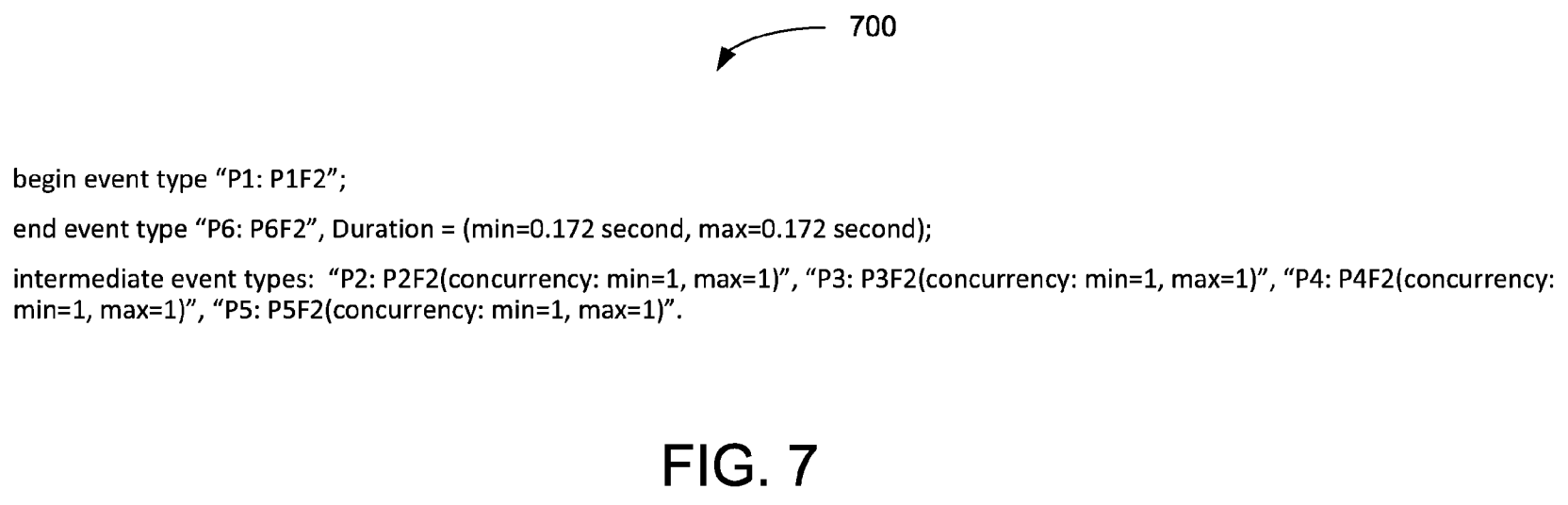

end event type “P6: P6F2”, Duration = (min=0.172 second, max=0.172 second);

intermediate event types: “P2: P2F2(concurrency: min=1, max=1)”, “P3: P3F2(concurrency: min=1, max=1)”, “P4: P4F2(concurrency: min=1, max=1)”, “P5: P5F2(concurrency: min=1, max=1)”.

FIG. 7

AUTOMATED EVENT ID FIELD ANALYSIS ON HETEROGENEOUS LOGS

RELATED APPLICATION INFORMATION

This application claims priority to U.S. Provisional Patent Application Ser. No. 62/311,436 filed on Mar. 22, 2016, incorporated herein by reference in its entirety.

BACKGROUND

Technical Field

The present invention generally relates to event identifiers and more particularly to automatically detecting event identifier (ID) content from heterogeneous logs and utilizing event ID content for log sequence analysis.

Description of the Related Art

Since event IDs are unique and would not usually be frequent, mining frequent patterns with event IDs and showing records they occurred in, provides an efficient way to mine frequent patterns in many types of databases including multiple tabled and distributed databases. Some techniques propose a set of algorithms for mining frequent patterns with their event IDs in a single transaction database, in a multiple tabled database, and in a distributed database. However, in those techniques the event ID attributes in the data base are specified manually, therefore this technique does not apply to heterogeneous system logs that are unstructured and have no attribute labels.

Other techniques propose a general methodology to mine heterogeneous system logs to automatically detect system runtime problems. They first parse console logs by combining source code analysis with information retrieval to create composite features, then analyze these features using machine learning to detect operational problems. Particularly on event IDs, they propose an algorithm to first automatically discover identifiers, then group together messages with the same identifier values, and create a vector per group.

SUMMARY

According to an aspect of the present principles, a method performed in a network having network devices, including computers, that generate heterogeneous logs which include a plurality of event sequences. The method includes identifying, by a processor from the heterogeneous logs, pattern fields comprised of a plurality of event identifiers. The method further includes generating, by the processor, an automata model by profiling event behaviors of the plurality of event sequences, the plurality of event sequences grouped in the automata model by combinations of one or more pattern fields and one or more event identifiers from among the plurality of event identifiers, wherein for a given combination, the one or more event identifiers therein must be respectively comprised in a same one of the one or more pattern fields with which it is combined. The method also includes detecting, by the processor, an anomaly in one of the plurality of event sequences using the automata model. The method additionally includes controlling, by the processor, an anomaly-initiating one of the network devices based on the anomaly.

According to another aspect of the present principles, a computer program product for automata model formation for a network having a plurality of network devices that generate heterogeneous logs which include a plurality of event sequences, the computer program product comprising a non-transitory computer readable storage medium having program instructions embodied therewith, the program instructions executable by a computer to cause the computer to perform a method. The method includes identifying, by a processor from the heterogeneous logs, pattern fields comprised of a plurality of event identifiers. The method further includes generating, by the processor, an automata model by profiling event behaviors of the plurality of event sequences, the plurality of event sequences grouped in the automata model by combinations of one or more pattern fields and one or more event identifiers from among the plurality of event identifiers, wherein for a given combination, the one or more event identifiers therein must be respectively comprised in a same one of the one or more pattern fields with which it is combined. The method also includes detecting, by the processor, an anomaly in one of the plurality of event sequences using the automata model. The method additionally includes controlling, by the processor, an anomaly-initiating one of the network devices based on the anomaly.

According to yet another aspect of the present principles, a computer processing system for anomaly detection for a network having a plurality of network devices that generate heterogeneous logs which include a plurality of event sequences is provided. The computer processing system includes a processor. The processor is configured to identify, from the heterogeneous logs, pattern fields comprised of a plurality of event identifiers. The processor is further configured to generate an automata model by profiling event behaviors of the plurality of event sequences, the plurality of event sequences grouped in the automata model by combinations of one or more pattern fields and one or more event identifiers from among the plurality of event identifiers, wherein for a given combination, the one or more event identifiers therein must be respectively comprised in a same one of the one or more pattern fields with which it is combined. The processor is additionally configured to detect an anomaly in one of the plurality of event sequences using the automata model. The processor is also configured to control an anomaly-initiating one of the network devices based on the anomaly.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 4 shows log formats 400 for the logs in FIG. 1, in accordance with an embodiment of the present invention;

FIG. 5 shows partial content of the inverse index hash table 500 for the logs in FIG. 1 with the log formats in FIG. 4, in accordance with an embodiment of the present invention;

FIG. 7 shows an event automata model 700 for the logs in FIG. 1, in accordance with an embodiment of the present invention;

DETAILED DESCRIPTION OF PREFERRED EMBODIMENTS

An embodiment of the present invention solves the problem of automatically detecting event ID content from heterogeneous logs and utilizing ID content for log sequence analysis in complex systems. Event IDs in streams of system event logs are the type of content which has the following patterns: (i) appear the same in multiple log instances; (ii) appear in many unique values through the history; (iii) appear at stable locations in the same log event type; and (iv) appear in stable structure across multiple log event types.

Figure 1:
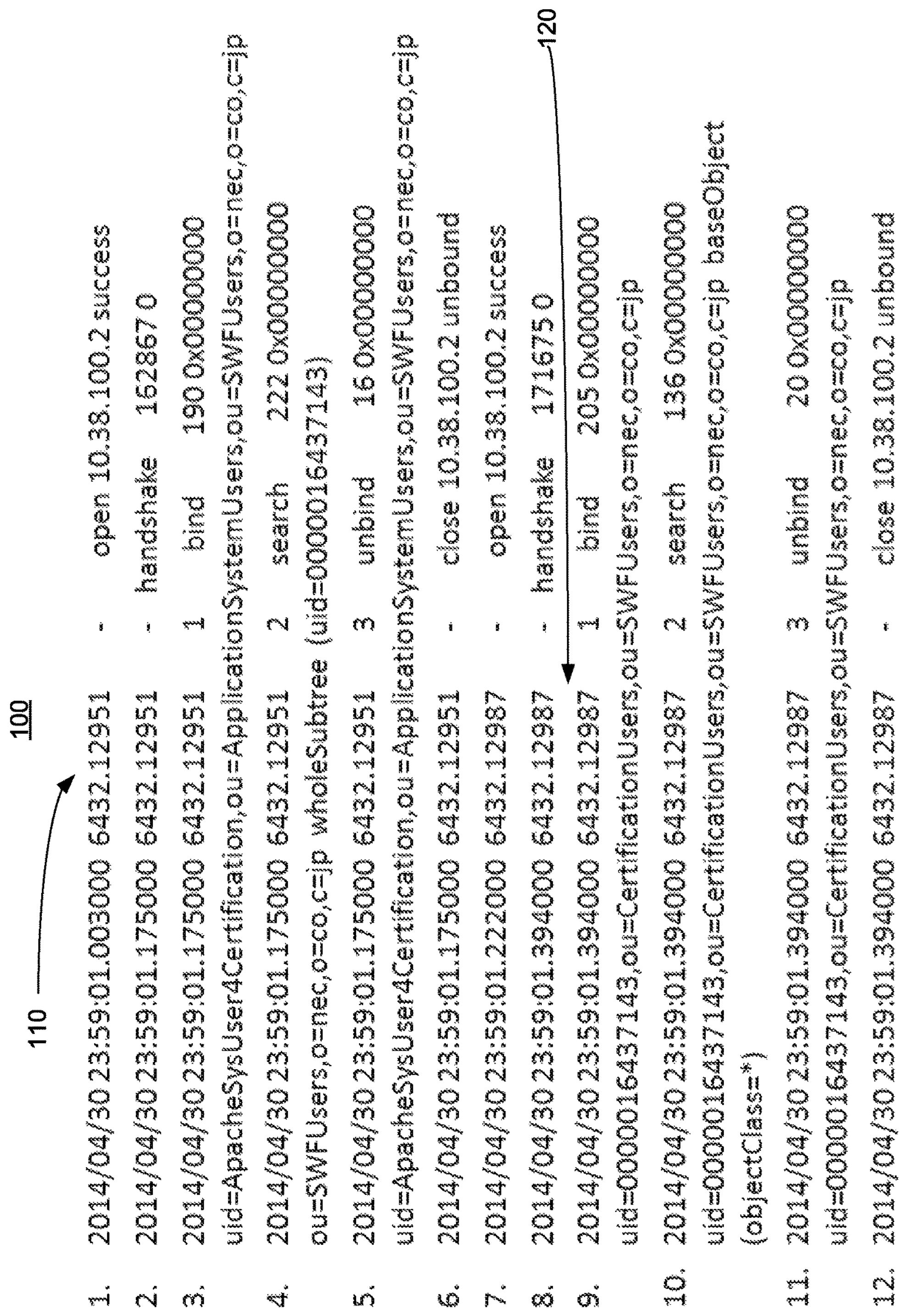
FIG. 1 show an exemplary sequence of operational logs including event ID content 100 to which the present invention can be applied, in accordance with an embodiment of the present invention.

Event IDs allow deterministic association of logs representing system/service behaviors such as database transactions, operational requests, work job scheduling events, and administration actions Referring now in detail to the figures in which like numerals represent the same or similar elements and initially to FIG. 1, an exemplary sequence of operational logs including event ID content 100 is illustratively shown. For logs 1 to 6 of the sequence of operational logs including event ID content 100, they make up one event and have the same event ID content 6432.12951 110; another event is composed of logs 7 to 12 with the same event ID content 6432.12987 120. Each event in the exemplary sequence has an open entry, a handshake entry, a bind entry, a search entry, an unbind entry, and a close entry.

An embodiment of the present invention provides a robust method to automatically discover event ID fields in heterogeneous logs; the event ID discovery algorithm is based on a log pattern set learnt from the same logs. The embodiment of the present invention further provides a fast event automata profiling scheme based on the discovered event ID fields to model the log sequences in the heterogeneous logs in an automata model. Last, the embodiment of the present invention includes a log analysis application of event sequence anomaly detection based on the learnt event ID fields and automata model. Moreover, based on the detection of an anomaly using an automata model, an anomaly-initiating one of a plurality of network devices (e.g., a computer in a cluster of computers, and so forth) can be controlled. In an embodiment, the control can involve powering down a root cause computer processing device at the anomaly-initiating one of the plurality of network devices to mitigate an error propagation therefrom. In an embodiment, the control can involve terminating a root cause process executing on a computer processing device at the anomaly-initiating one of the plurality of network devices to mitigate an error propagation therefrom. The computer causing the anomaly may also be isolated by disabling the port in the switch the computer is using to connect to the network. A system administrator may also be alerted to the anomaly and computers/users causing the anomaly, so the system administrator can investigate the anomaly.

An embodiment of the present invention significantly reduces the complexity of finding statistically event sequence patterns in huge amounts of heterogeneous logs, even when prior knowledge about the system might not be available. By integrating advanced text mining and sequential event mining analysis in a novel way, the embodiment of the present invention constructs an automatic event ID field discovery method for heterogeneous logs in a principled way, and allows faster event sequence analysis.

Figure 2:
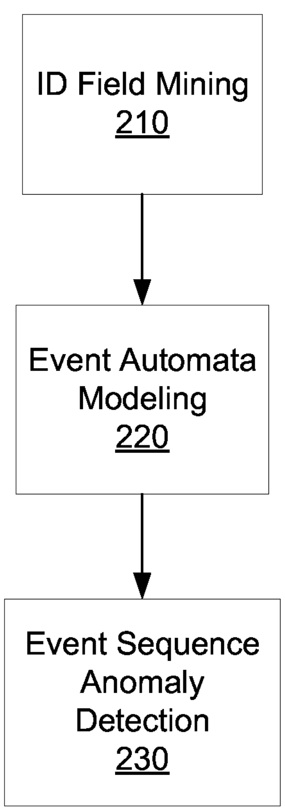
FIG. 2 shows an exemplary system/method 200 for an automated event ID field analysis process, in accordance with an embodiment of the present invention.

Referring now to FIG. 2, an automated event ID field analysis (AEIFA) process 200 is illustratively shown. In one embodiment, the automated event ID field analysis process 200 may include an ID field mining block 210. The ID field mining block 210 takes heterogeneous logs from arbitrary/unknown systems or applications. The training stage uses the ID field mining block 210 for identifying associated pattern fields composing event IDs in heterogeneous logs.

In another embodiment, the automated event ID field analysis process 200 may include an event automata modeling block 220. The event automata modeling block 220 corresponds to the processes of profiling and summarizing event behaviors on log sequence sets grouped by ID content, which is defined by the event ID field content discovered in the ID field mining block 210.

In yet another embodiment, the automated event ID field analysis process 200 may include an event sequence anomaly detection block 230. The event sequence anomaly detection block 230 takes heterogeneous logs collected from the same system in the ID field mining block 210 for event sequence behavior testing. The process uses the event automata learnt from the event automata modeling block 220 for profiling and detecting abnormal behaviors of log sequence sets grouped by ID content, which is defined by the event ID field content discovered in the ID field mining block 210.

Figure 3:
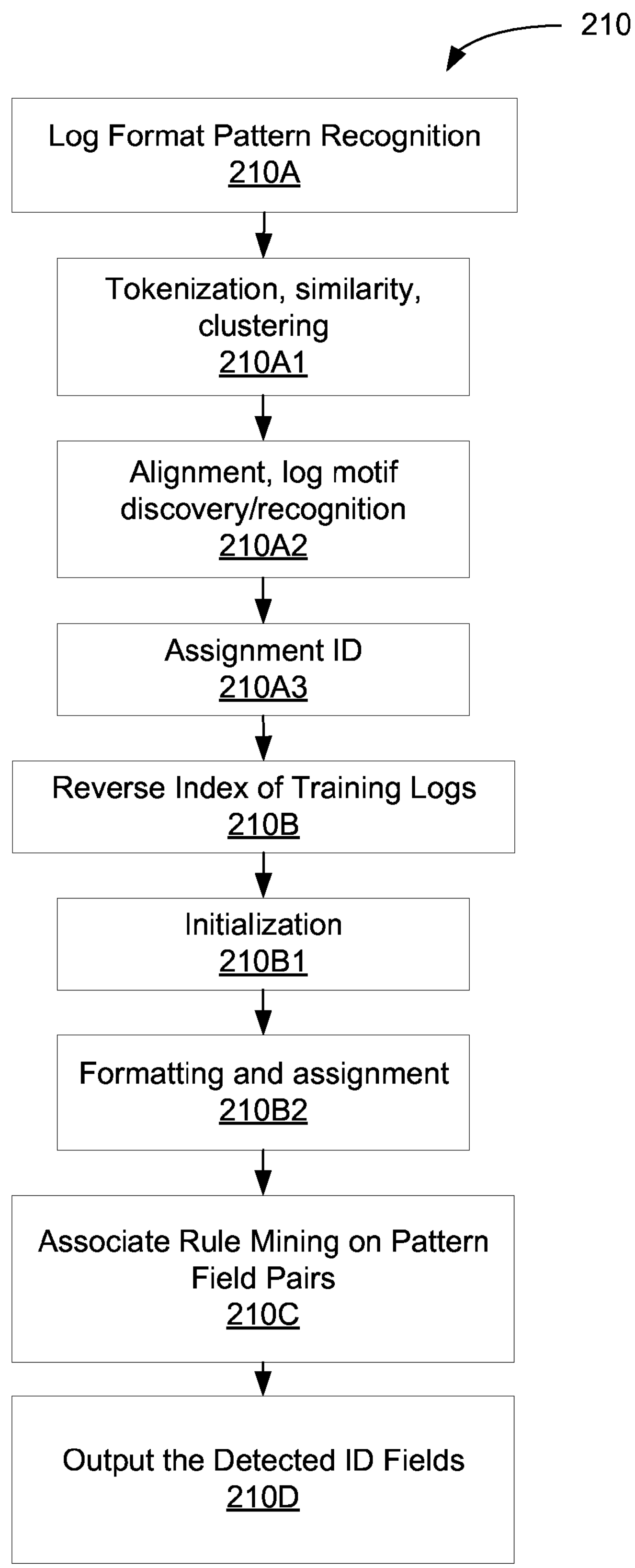
FIG. 3 further shows the ID field mining block 210 of FIG. 2, in accordance with an embodiment of the present invention.

FIG. 3 further shows the ID field mining block 210 of FIG. 2, in accordance with an embodiment of the present invention.

The ID field mining block 210 includes a log format pattern recognition block 210A, a reverse index of training logs block 210B, an associate rule mining on pattern field pairs block 210C, and an output the detected ID field block 210D.

Regarding the log format pattern recognition block 210A, a set of log formats matching the training logs can be provided by users directly, or generated automatically by a format recognition procedure on all the heterogeneous logs as follows in block 210A1-210A3:

Block 210A1: tokenization, similarity, clustering;

Block 210A2: alignment, log motif discovery/recognition; and

Block 210A3: assignment ID.

At block 210A1 (tokenization; similarity; clustering), taking the input heterogeneous logs, a generic tokenization is processed is so as to generate semantically meaningful tokens from logs. After the heterogeneous logs are tokenized, a similarity measurement on heterogeneous logs is applied. This similarity measurement leverages both the log layout information and log content information, and it is specially tailored to arbitrary heterogeneous logs. Once the similarities among logs are captured, a log hierarchical clustering algorithm can be applied so as to generate and output a log cluster hierarchy. AEIFA allows users to plug in their favorite clustering algorithms.

At block 210A2 (alignment; log motif discovery/recognition), once the log cluster hierarchies are received, within each cluster that on the lowest level in the log cluster hierarchy, the logs are aligned. The log alignment is designed to preserve the unknown layouts of heterogeneous logs so as to help log pattern recognition in the following steps. Once the logs are aligned, log motif discovery is conducted so as to find the most representative layouts and log fields.

The following steps are a pattern recognition from such motifs. First, fields such as time stamps, Internet Protocol (IP) addresses and universal resource locators (URLs) are recognized. Second, other fields which are highly conserved in the logs are recognized and organized in a data structure in the cluster hierarchy. Note that the above log motif discovery and pattern recognition is first done in the lowest level of the log hierarchy. After that, all the information is back propagated up to higher levels in the hierarchy, and fused with their local patterns to provide format pattern representations from the logs. The recognized log format patterns are in form of regular expressions.

At block 210A3 (assignment ID), assign a filed ID for each variable field in a recognized log format pattern. The field ID consists of two parts: the ID of the log format pattern that this field belongs to, and the sequence number of this field compared to other fields in the same log format pattern. The log format pattern IDs can be assigned with the integer number {1, 2, 3, . . . n} for a log pattern set of size N, and the field sequence order can be assigned with the integer number {1, 2, 3, . . . k} for a log format with k variable fields.

FIG. 4 shows 6 log formats 400 recognized for the logs in FIG. 1. The log formats are assigned pattern IDs from 1 to 6; in Pattern 1, the 3 variable fields are assigned the IDs P1F1, P1F2, and P1F3; variable fields in other format patterns are assigned ID in a similar way. That is, FIG. 4 shows an example of log format pattern recognition block 210A for the logs in FIG. 1, in accordance with an embodiment of the present invention.

Regarding the reverse index of training logs block 210B, for the training logs, following is the reverse index generation procedure based on the log formats generated in the log format pattern recognition block 210A as follows in block 210B1-210B2:

Block 210B1: initialization; and

Block 210B2: formatting and assignment.

At block 210B1 (initialization), initialize a hash table H where the key is an index key, and the value is an object set.

At block 210B2 (formatting and assignment), for each training log $L_i$, repeat the following: (i) find the format pattern Pattern-x matching $L_i$ (e.g., through a regular expression test) among the recognized log formats in the log format pattern recognition block 210A and (ii) assign the value v for each variable field $PxF_j$ in Pattern-x for the matched part in $L_i$; then insert into H under the key v as H(v).insert(($PxF_j$, $L_i$)).

FIG. 5 shows partial content of the inverse index hash table 500 for the logs in FIG. 1 with the log formats in FIG. 4. That is, FIG. 5 shows an example of reverse index of training logs block 210B for the logs in FIG. 1 with the log formats in FIG. 4, in accordance with an embodiment of the present invention.

Regarding the associate rule mining on pattern field pairs block 210C, for the reverse index hash table H built in the index of training logs block 210B, following is the associate rule mining process for the pattern field sets grouped under the hash table keys:

(A) initialize a hash table T where the key is a composite index key, and the value is an object set;

(B) for each entry under the key k in the hash table H, repeat the following: (i) if the value of H(k) has only one pattern field, continue (ii) otherwise, create a composite key ck which includes all the pattern fields in H(k), and insert into T under the key ck all the log numbers $L_i$ in H(k);

(C) initialize a hash table F where the key is a composite index key, and the value is an integer initialized as 0;

(D) for each entry under the key k in the hash table T, repeat the following: (i) assign the integer i as the total number of unique logs in T(k) and (ii) for each unique 2-fields pair $P=(P_iF_x,P_jF_y)$ derived from the pattern fields contained in the composite key k, update T so that F(p)=F (p)+I;

(E) initialize an object set IDs={ };

(F) for each entry under the key $k=(P_iF_x,P_jF_y)$ in the hash table F, repeat the following: (i) if F(k) equals the number of the training logs matching pattern $P_i$ or $P_j$, discover two ID fields $P_iF_x$ and $P_iF_y$, and insert into IDs.insert($P_iF_x$,$P_jF_y$), otherwise, (ii) continue.

Regarding the output the detected ID field block 210D, for the pattern fields in IDs built in the associate rule mining on pattern field pairs block 210C, output them to the ID field model file.

Figure 6:
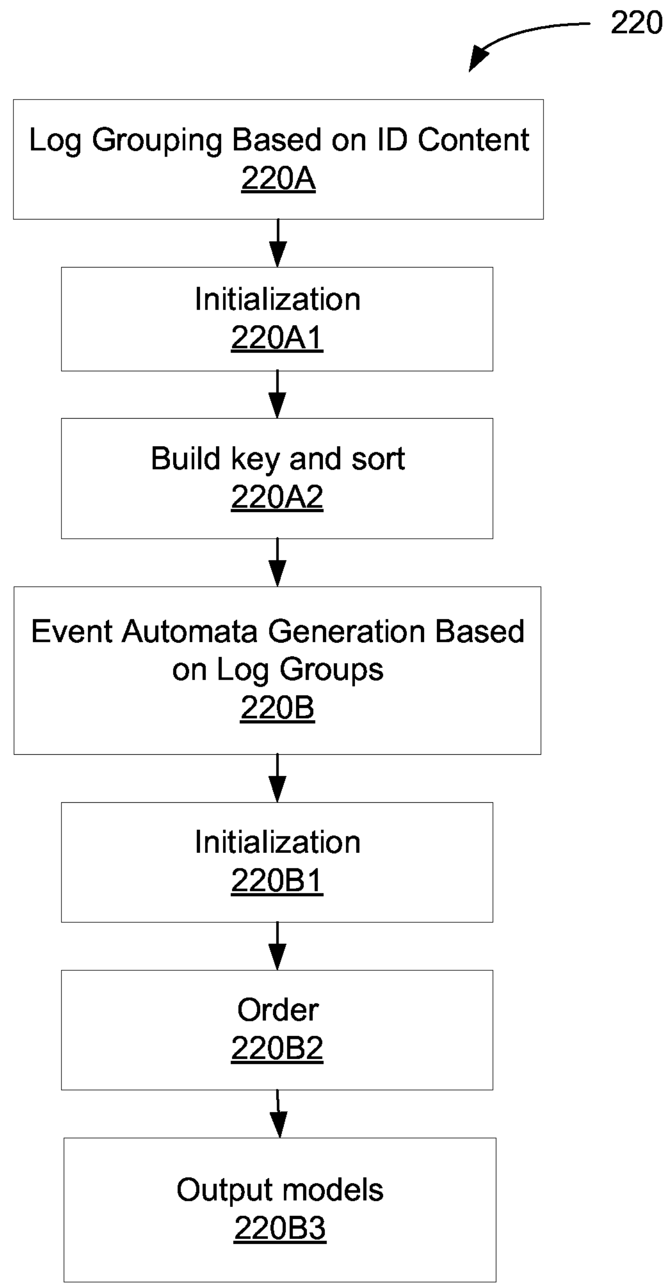
FIG. 6 further shows the event automata modeling block 220 of FIG. 2, in accordance with an embodiment of the present invention.

FIG. 6 further shows the event automata modeling block 220 of FIG. 2, in accordance with an embodiment of the present invention.

The event automata modeling block 220 includes a log grouping based on ID content block 220A and an event automata generation based on long groups block 220B.

Regarding the log grouping based on ID content 220A, set of logs grouped based on ID content as follows in block 220A1-220A2:

Block 220A1: initialization; and

Block 220A2: build key and sort.

At block 220A1 (initialization), initialize a hash table G where key is a composite index key, and value is an ordered object list.

At block 220A2 (build key and sort), for each log $L_i$ in the training logs, repeat the following: (i) if the log format $P_j$ matching this log contains any ID field discovered in the ID field mining block 210, build a composite key k which consists of the log content matching those ID fields, and insert into the hash table G as G(k).insert((time_stamp($L_i$), IDs($P_j$))), where time_stamp($L_i$) is the time stamp of $L_i$, and the ordered object list is sorted by the time stamps; IDs($P_j$) is the ID fields of the log format $P_j$, otherwise, (ii) continue.

Regarding the event automata generation based on long groups block 220B, generate event automata based on log groups as follows in block 220B1-220B3:

Block 220B1: initialization;

Block 220B2: order; and

Block 220B3: output models.

At block 220B1 (initialization), initialize an automata mode set M.

At block 220B2 (order), for each entry under the key k in the hash table G, repeat the following: for the ordered ID field sets in G(k), let IDs($P_{begin}$) be the earliest based on the time order, IDs($P_{end}$) be the latest based on the time order, and {IDs($P_{intermediate}$)} be the rest of the ID field sets: (i) if the model set M has no event automata with its begin event pattern matching IDs($P_{begin}$) and end event pattern matching IDs($P_{end}$), create a new event automata model in M, with its begin event type set as IDs($P_{begin}$), and its end event pattern set as IDs($P_{end}$), the {min,max} duration between its begin event type and its end event pattern set as the difference between the time stamp of IDs($P_{begin}$) and IDs($P_{end}$), and adding the intermediate event types with {IDs($P_{intermediate}$)}, and set all the {min,max} concurrency of the intermediate event types based on their frequency in {IDs($P_{intermediate}$)}, otherwise, (ii) if there is already an event automat model in the model set M with its begin event pattern matching IDs($P_{begin}$) and end event pattern matching IDs(Pend); update that event automata model on the {min,max} duration between its begin event type and its end event pattern based on the difference between the time stamp of IDs ($P_{begin}$) and IDs($P_{end}$), and also update the intermediate event types and their {min,max} concurrency based on {IDs($P_{intermediate}$)} accordingly.

At block 220B3 (output models), for the event automat models in M, output them to the event automat model file.

FIG. 7 shows an event automata model 700 for the logs in FIG. 1. That is, FIG. 7 shows an example of the event automata modeling block 220 for the logs in FIG. 1, in accordance with an embodiment of the present invention.

Figure 8:
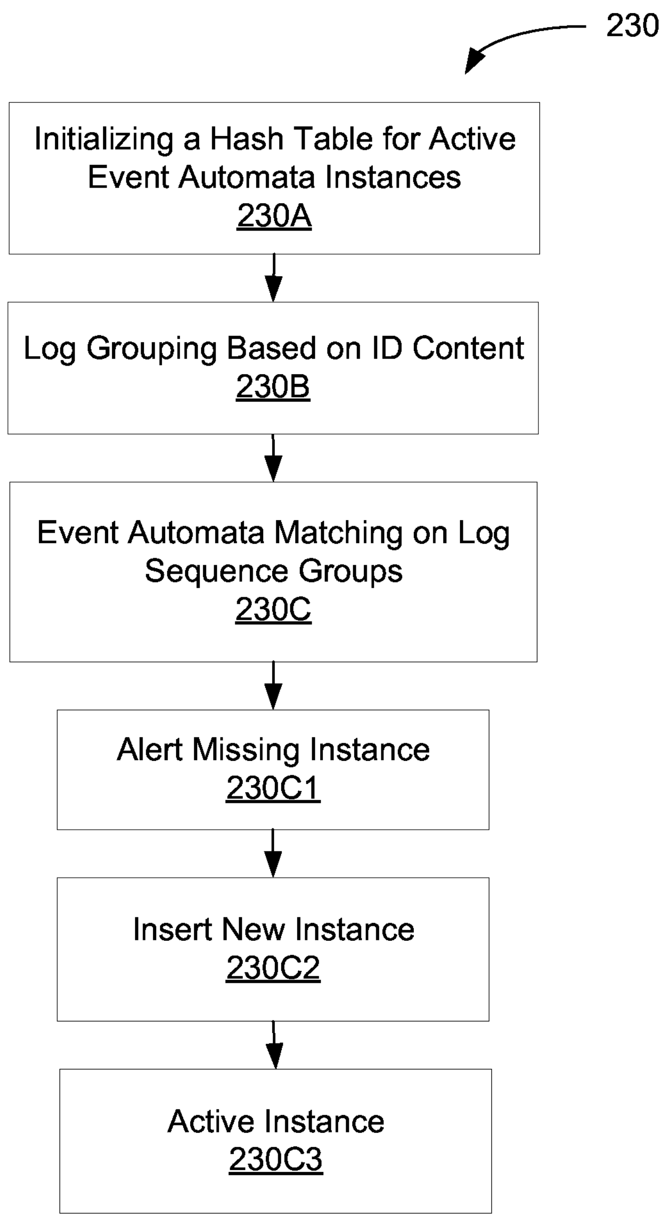
FIG. 8 further shows the event sequence anomaly detection block 230 of FIG. 2, in accordance with an embodiment of the present invention.

FIG. 8 further shows the event sequence anomaly detection block 230 of FIG. 2, in accordance with an embodiment of the present invention.

The event sequence anomaly detection block 230 includes initializing a hash table for active event automata instances block 230A, a log grouping based on ID content block 230B, and event automata matching on log sequence groups block 230C.

Regarding the initializing a hash table for active event automata instances block 230A, the hash table E uses ID content as the key, and active automata instances as the value. Initially it is empty.

Regarding the log grouping based on ID content block 230B, for each arriving log L from the testing log stream, if its matching format pattern does not contain any ID field in any automata model discovered in the event automata modeling block 220, continue to the next log, otherwise, go to the event automata matching on log sequence groups block 230C.

Regarding the event automata generation based on long groups block 230C, generate event automata based on log groups as follows in block 230C1-230C3:

Block 230C1: alert missing instance;
Block 230C2: insert new instance; and
Block 230C3: active instance.

At block 230C1 (alert missing instance), if there is no active automata instance in the hash table E under the key C, and L's ID fields do not match the beginning event type of any automata discovered in the event automata modeling block 220, report an alert message for log L about missing other expected events based on the automata model it matches, then go back to the log grouping based on ID content block 230B for the next log.

At block 230C2 (insert new instance), if there is no active automata instance in the hash table E under the key C, and L's ID fields match the begin event type of any automata discovered in the event automata modeling block 220, insert into the hash table E under the key C a new active automata instance, then go back to the log grouping based on ID content block 230B for the next log.

At block 230C3 (active instance), if there is an active automata instance A in the hash table E under the key C: (i) if L's ID fields match the end event type of A, check A's model parameter violation on the (min,max) duration and (min,max) intermediate event concurrency based on the past logs with the same ID content C and the log L; if there is any violation, report an alert message for the automata instance A about those logs causing the model violation; finally, remove automata instance A from the hash table E; then go back to the log grouping based on ID content block 230B for the next log, otherwise (ii) if L's ID fields does not match the end event type of A, update A's model parameters on the related (min,max) intermediate event concurrency based on the past logs with the same ID content C and the log L; if there is any violation, report an alert message for log L causing the model violation; then go back to the log grouping based on ID content block 230B for the next log.

Figure 9:
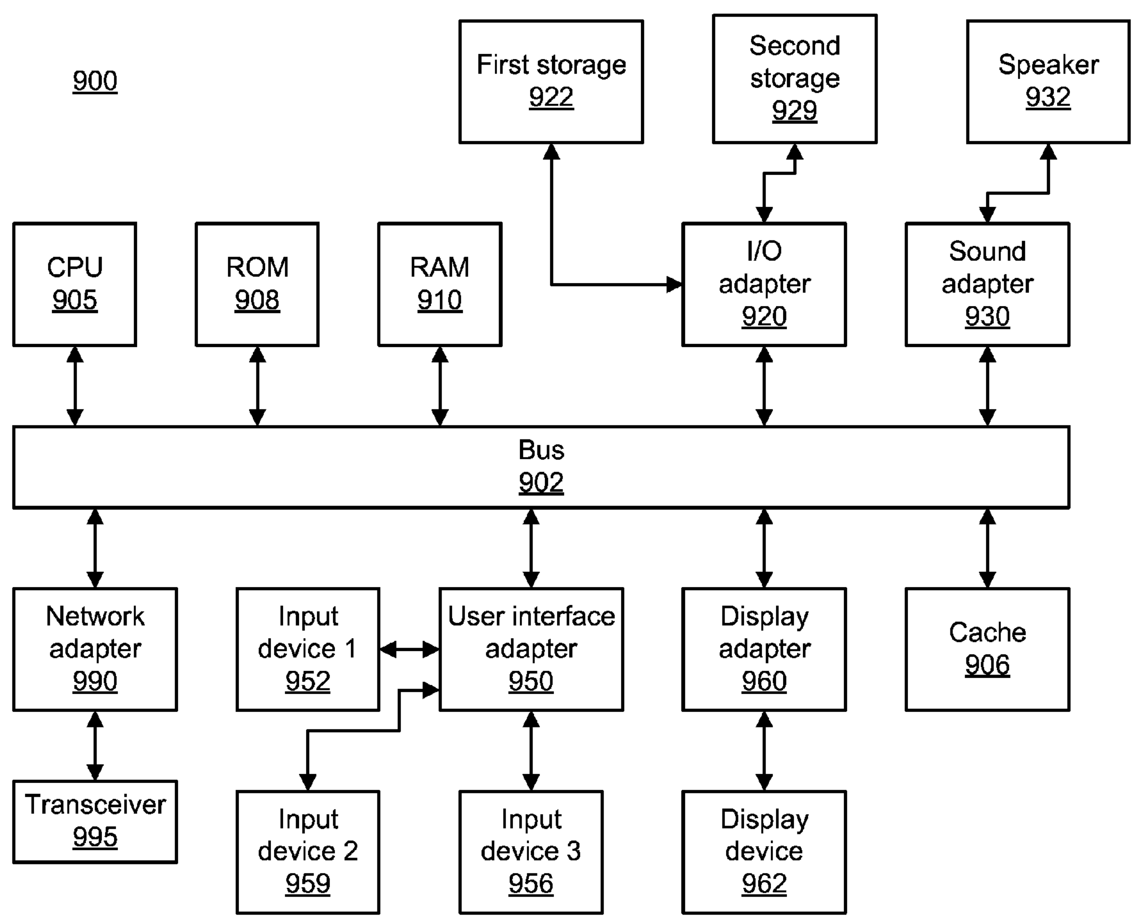
FIG. 9 is a block diagram illustrating a computer system, in accordance with an embodiment of the present invention.

Referring to FIG. 9, an exemplary computer system 900 is shown which may represent a server or a network device, in accordance with an embodiment of the present invention. The computer system 900 includes at least one processor (CPU) 905 operatively coupled to other components via a system bus 902. A cache 906, a Read Only Memory (ROM) 908, a Random Access Memory (RAM) 910, an input/output (I/O) adapter 920, a sound adapter 930, a network adapter 990, a user interface adapter 950, and a display adapter 960, are operatively coupled to the system bus 902.

A first storage device 922 and a second storage device 929 are operatively coupled to system bus 902 by the I/O adapter 920. The storage devices 922 and 929 can be any of a disk storage device (e.g., a magnetic or optical disk storage device), a solid state magnetic device, and so forth. The storage devices 922 and 929 can be the same type of storage device or different types of storage devices.

A speaker 932 may be operatively coupled to system bus 902 by the sound adapter 930. A transceiver 995 is operatively coupled to system bus 902 by network adapter 990. A display device 962 is operatively coupled to system bus 902 by display adapter 960.

A first user input device 952, a second user input device 959, and a third user input device 956 are operatively coupled to system bus 902 by user interface adapter 950. The user input devices 952, 959, and 956 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 952, 959, and 956 can be the same type of user input device or different types of user input devices. The user input devices 952, 959, and 956 are used to input and output information to and from system 900.

Of course, the computer system 900 may also include other elements (not shown), as readily contemplated by one of skill in the art, as well as omit certain elements. For example, various other input devices and/or output devices can be included in computer system 900, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 900 are readily contemplated by one of ordinary skill in the art given the teachings of the present invention provided herein.

Figure 10:
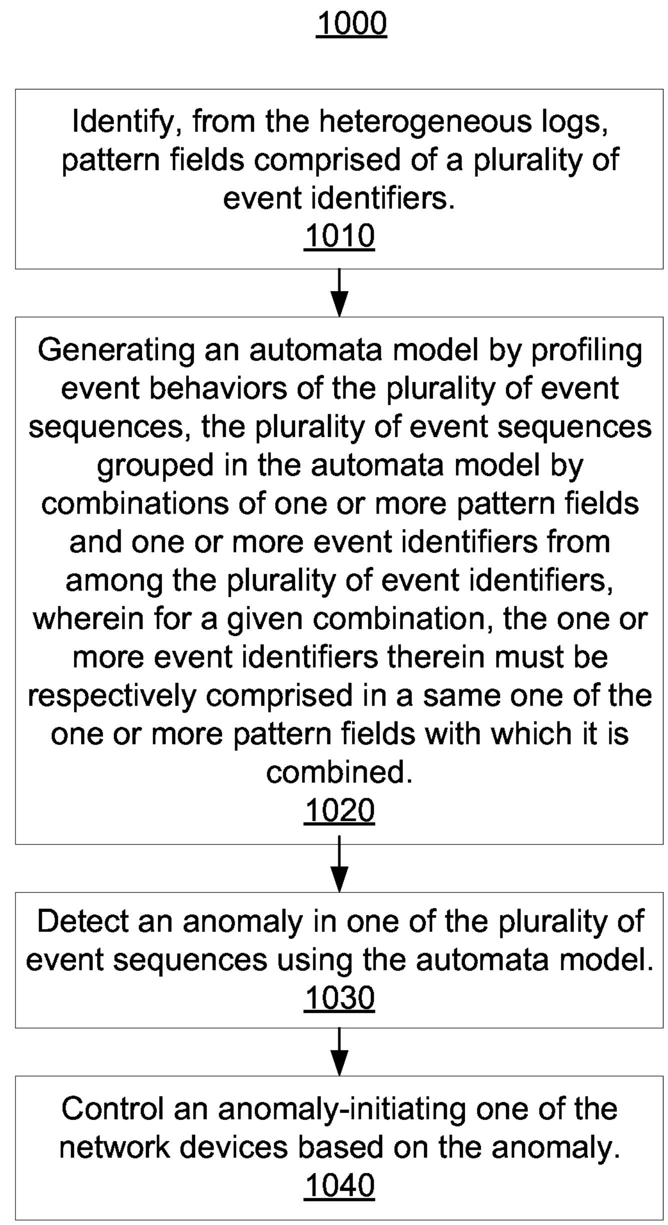
FIG. 10 is a flow diagram illustrating a method for heterogeneous log anomaly detection, in accordance with an embodiment of the present invention.

Referring to FIG. 10, a flow chart for a heterogeneous log anomaly detection method 1000 is illustratively shown, in accordance with an embodiment of the present invention. In block 1010, identify, from the heterogeneous logs, pattern fields comprised of a plurality of event identifiers. In block 1020, generate an automata model by profiling event behaviors of the plurality of event sequences, the plurality of event sequences grouped in the automata model by combinations of one or more pattern fields and one or more event identifiers from among the plurality of event identifiers, wherein for a given combination, the one or more event identifiers therein must be respectively comprised in a same one of the one or more pattern fields with which it is combined. In block 1030, detect an anomaly in one of the plurality of event sequences using the automata model. In block 1040, control an anomaly-initiating one of the network devices based on the anomaly.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method performed in a network having network devices, including computers, that generate heterogeneous logs which include a plurality of event sequences, the method comprising:

identifying, by a processor from the heterogeneous logs, pattern fields comprised of a plurality of event identifiers;

generating, by the processor, an automata model by profiling event behaviors of the plurality of event sequences, the plurality of event sequences grouped in the automata model by combinations of one or more pattern fields and one or more event identifiers from among the plurality of event identifiers, wherein for a given combination, the one or more event identifiers therein must be respectively comprised in a same one of the one or more pattern fields with which it is combined;

detecting, by the processor, an anomaly in one of the plurality of event sequences using the automata model; and controlling, by the processor, an anomaly-initiating one of the network devices based on the anomaly wherein the identifying pattern fields comprises:

performing a tokenization process on the heterogeneous logs to generate tokens;

performing a log similarity process on the heterogeneous logs based on the tokens to identify log similarities amongst the heterogeneous logs; and clustering the heterogeneous logs based on the log similarities to obtain clustered heterogeneous logs; and wherein the identifying pattern fields further comprises:

aligning the clustered heterogeneous logs to preserve unknown layouts;

discovering a log motif to find a most representative layout from the unknown layouts and a plurality of log fields;

organizing the plurality of log fields into a hierarchical data structure based on the most representative layout; and assigning field identifiers to the plurality of log fields in the hierarchical data structure based on a corresponding hierarchical layer in the hierarchical data structure.

2. The method of claim 1, wherein the identifying pattern fields comprises:

initializing a hash table with an index key and an object set; and populating the hash table using a value from a plurality of log fields as the index key and a field identifier corresponding the one of the plurality of log fields as the object set.

3. The method of claim 1, wherein the generating automata model comprises:

initializing a hash table with an index key and an object set; and populating the hash table using a value from one of the pattern fields as the index key and a time stamp corresponding to the value as the object set.

4. The method of claim 3, wherein the generating automata model further comprises:

ordering the hash table firstly based on values in the index key and then secondly based on the time stamp values in the object set; and generating the automata model correlating to all the hash tables entries for a unique pattern field value with a begin entry correlating to the hash table entry with an earliest time stamp as the object set, an end entry correlating to the hash table entry with a latest time stamp as the object set, and intermediate entries for all other hash table entries for the unique pattern field value.

5. A method performed in a network having network devices, including computers, that generate heterogeneous logs which include a plurality of event sequences, the method comprising:

identifying, by a processor from the heterogeneous logs, pattern fields comprised of a plurality of event identifiers;

generating, by the processor, an automata model by profiling event behaviors of the plurality of event sequences, the plurality of event sequences grouped in the automata model by combinations of one or more pattern fields and one or more event identifiers from among the plurality of event identifiers, wherein for a given combination, the one or more event identifiers therein must be respectively comprised in a same one of the one or more pattern fields with which it is combined;

detecting, by the processor, an anomaly in one of the plurality of event sequences using the automata model; and controlling, by the processor, an anomaly-initiating one of the network devices based on the anomaly, wherein the detecting the anomaly comprises initializing a hash table for active event automata instances, performing a log grouping based on an identifier content process, and performing an event automata matching process.

6. The method of claim 1, wherein controlling the anomaly-initiating one of the plurality of network devices includes isolating the anomaly-initiating one of the plurality of network devices.

7. A computer program product for automata model formation for a network having a plurality of network devices that generate heterogeneous logs which include a plurality of event sequences, the computer program product comprising a non-transitory computer readable storage medium having program instructions embodied therewith, the program instructions executable by a computer to cause the computer to perform a method comprising:

identifying, by a processor from the heterogeneous logs, pattern fields comprised of a plurality of event identifiers;

generating, by the processor, an automata model by profiling event behaviors of the plurality of event sequences, the plurality of event sequences in the automata model grouped by combinations of one or more pattern fields and one or more event identifiers from among the plurality of event identifiers, wherein for a given combination, the one or more event identifiers therein must be respectively comprised in a same one of the one or more pattern fields with which it is combined;

detecting, by the processor, an anomaly in one of the plurality of event sequences using the automata model; and controlling, by the processor, an anomaly-initiating one of the network devices based on the anomaly;

wherein the detecting the anomaly comprises initializing a hash table for active event automata instances, performing a log grouping based on an identifier content process, and performing an event automata matching process.

8. The computer program product of claim 7, wherein the identifying pattern fields comprises:

performing a tokenization process on the heterogeneous logs to generate tokens;

performing a log similarity process on the heterogeneous logs based on the tokens to identify log similarities amongst the heterogeneous logs; and clustering the heterogeneous logs based on the log similarities to obtain clustered heterogeneous logs.

9. The computer program product of claim 8, wherein the identifying pattern fields further comprises:

aligning the clustered heterogeneous logs to preserve unknown layouts;

discovering a log motif to find a most representative layout of the unknown layouts and a plurality of log fields;

organizing the plurality of log fields into a hierarchical data structure based on the most representative layout; and assigning field identifiers to the plurality of log fields in the hierarchical data structure based on a corresponding hierarchical layer in the hierarchical data structure.

10. The computer program product of claim 7, wherein the identifying pattern fields comprises:

initializing a hash table with an index key and an object set; and populating the hash table using a value from a plurality of log fields as the index key and a field identifier corresponding to the one of the plurality of log fields as the object set.

11. The computer program product of claim 7, wherein the generating automata model comprises:

initializing a hash table with an index key and an object set; and populating the hash table using a value from one of the pattern fields as the index key and a time stamp corresponding to the value as the object set.

12. The computer program product of claim 11, wherein the generating automata model further comprises:

ordering the hash table firstly based on values in the index key and then secondly based on the time stamp values in the object set; and generating the automata model correlating to all the hash tables entries for a unique pattern field value with a begin entry correlating to the hash table entry with an earliest time stamp as the object set, an end entry correlating to the hash table entry with a latest time stamp as the object set, and intermediate entries for all other hash table entries for the unique pattern field value.

* * * * *